US009207433B2

(12) United States Patent
Blayvas

(10) Patent No.: US 9,207,433 B2
(45) Date of Patent: Dec. 8, 2015

(54) IMAGING ENHANCEMENTS FOR MOBILE DEVICES USING OPTICAL PATH FOLDING

(75) Inventor: Ilya Blayvas, Holon (IL)

(73) Assignee: Broadcom Corporation, Irvine, CA (US)

( * ) Notice: Subject to any disclaimer, the term of this patent is extended or adjusted under 35 U.S.C. 154(b) by 661 days.

(21) Appl. No.: 13/529,094

(22) Filed: Jun. 21, 2012

(65) Prior Publication Data

US 2013/0342742 A1 Dec. 26, 2013

(51) Int. Cl.
*G02B 17/08* (2006.01)
*G02B 13/00* (2006.01)
*H04N 5/225* (2006.01)

(52) U.S. Cl.
CPC .......... *G02B 13/007* (2013.01); *G02B 17/0808* (2013.01); *H04N 5/2254* (2013.01)

(58) Field of Classification Search
CPC . H04N 5/2254; H04N 5/2251; H04N 5/2253; H04N 5/2257; H04N 5/225; H04N 9/317; G02B 13/001–13/009; G02B 17/08; G02B 21/362; G02B 17/17; G02B 17/0808; G02B 17/0804; G02B 5/08; G02B 21/04; G02B 23/06; G02B 17/0856; G02B 2027/0138; G02B 21/02; G02B 21/06; G02B 21/36; G02B 21/361; G02B 23/02; G02B 7/183; G02B 17/00; G02B 17/004; G02B 17/02; G02B 17/084; G02B 17/0876; G02B 27/0977; G02B 27/0983; G02B 27/18; G03F 7/70225; G03F 7/7015; G03F 7/70233; G03F 21/28; G03F 21/14

See application file for complete search history.

(56) References Cited

U.S. PATENT DOCUMENTS

| 4,792,685 | A * | 12/1988 | Yamakawa | 250/353 |
| 6,593,561 | B2 * | 7/2003 | Bacarella et al. | 250/208.1 |
| 7,408,703 | B2 * | 8/2008 | Matsuki et al. | 359/365 |
| 7,586,678 | B2 * | 9/2009 | Bergeron et al. | 359/420 |
| 7,764,440 | B2 * | 7/2010 | Border et al. | 359/721 |
| 7,906,722 | B2 * | 3/2011 | Fork et al. | 136/246 |
| 8,953,084 | B2 * | 2/2015 | Kamath | 348/335 |

* cited by examiner

*Primary Examiner* — Derek S Chapel
(74) *Attorney, Agent, or Firm* — McDermott Will & Emery LLP

(57) ABSTRACT

Disclosed are various embodiments for an image capture device using a folded optical pathway. The optical pathway comprises a primary mirror and an image sensor centered on a first reflective surface of the primary mirror. The optical pathway further comprises a secondary mirror positioned with a second reflective surface facing the image sensor, the secondary mirror being centered with the primary mirror and located a first distance from the image sensor, the primary mirror extending beyond an edge of the secondary mirror.

20 Claims, 5 Drawing Sheets

IMAGING ENHANCEMENTS FOR MOBILE DEVICES USING OPTICAL PATH FOLDING

BACKGROUND

Many modern electronic mobile devices, such as smartphones and tablet computers, are driven by market requirements to be increasingly thin and more powerful. Many of these electronic mobile devices include one or more cameras used for capturing still images and/or video. As with other functions of the electronic mobile devices, the cameras used are driven by market requirements to improve performance, particularly in the form of improved image and/or video quality. The improvements in overall imaging quality may result in increased image resolution, increased low-light sensitivity, decreased image "noise," increased color accuracy, increased image uniformity, and/or other image quality characteristics.

However, improvements in the camera performance are often constrained by the requirement that the camera fit into an increasingly thin electronic mobile device. Traditionally, improving camera quality implies using a larger image sensor and/or a lens with a larger diameter. As a consequence of the traditional approach, the distance from the image sensor of the camera to the lens (the "optical track") must be increased in order to accommodate the larger sensor and/or lens. Instead, market requirements suggest that optical tracks should be as short as possible in order to fit within increasingly thin electronic mobile devices, thus limiting the image quality of the cameras.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure relate to systems and methods that can operate in an image capture device. More specifically, embodiments of the disclosure relate to systems and methods for extending the effective focal length of an image capture device, thereby producing improvements in image quality and/or a smaller image capture device. In the context of this disclosure, an image capture device can include a camera, video camera, a mobile device with an integrated image capture device, or other devices suitable to capturing imagery and/or video as can be appreciated. In some embodiments, an image capture device according to an embodiment of the disclosure can include a device such as a smartphone, tablet computing system, laptop computer, desktop computer, or any other computing device that has the capability to receive and/or capture imagery via image capture hardware.

Accordingly, image capture device hardware can include components such as lenses, image sensors (e.g., charge coupled devices (CCD), complementary metal-oxide-semiconductor (CMOS), etc.), processor(s), image signal processor(s), a main processor, memory, mass storage, or any other hardware or software components that can facilitate capture of imagery and/or video. In some embodiments, an image signal processor can be incorporated as a part of a main processor in an image capture device module that is in turn incorporated into a device having its own processor, memory and other components.

An image capture device according to an embodiment of the disclosure can provide a user interface via a display that is integrated into the image capture device. The display can be integrated with a mobile device, such as a smartphone and/or tablet computing device, and can include a touchscreen input device (e.g., a capacitive touchscreen, etc.) with which a user may interact with the user interface that is presented thereon. The image capture device hardware can also include one or more buttons, dials, toggles, switches, or other input devices with which the user can interact with software executed in the image capture device.

Figure 1A:
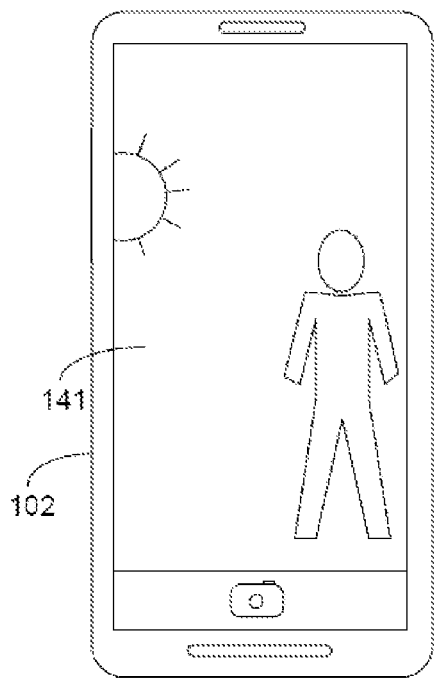
FIGS. 1A and 1B are drawings of a mobile device incorporating an image capture device according to various embodiments of the disclosure.
Figure 1B:
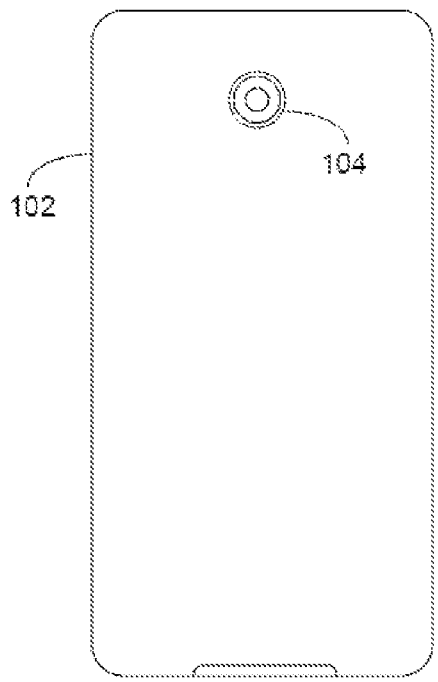

Referring now to the drawings, FIGS. 1A-1B show a mobile device 102 that can comprise and/or incorporate an image capture device according to various embodiments of the disclosure. The mobile device 102 may be, for example, a processor-based system, such as a desktop computer, a laptop computer, a personal digital assistant, a mobile communication device (e.g., cellular telephone, smartphone, etc.), a digital camera, a tablet computing system, a set-top box, a digital music player, etc. The mobile device 102 can include, for example, an image capture device 104, which can further include a lens system as well as other hardware components that can be integrated with the device to facilitate image capture. The mobile device 102 can also include a display device 141 upon which various content and other user interfaces may be rendered. The mobile device 102 can also include one or more input devices with which a user can interact with a user interface rendered on the display device 141. For example, the mobile device 102 can include or be in communication with a mouse, touch input device (e.g., capacitive and/or resistive touchscreen incorporated with the display device 141), keyboard, or other input devices.

The mobile device 102 may be configured to execute various applications, such as a camera application that can interact with an image capture module that includes various hardware and/or software components that facilitate capture and/or storage of images and/or video. In one embodiment, the camera application can interact with application programming interfaces (API's) and/or other software libraries and/or drivers that are provided for the purpose interacting with image capture hardware, such as the lens system and other image capture hardware. The camera application can be a special purpose application, a plug-in or executable library, one or more API's, image control algorithms, image capture device firmware, or other software that can facilitate communication with image capture hardware in communication with the mobile device 102.

Figure 2:
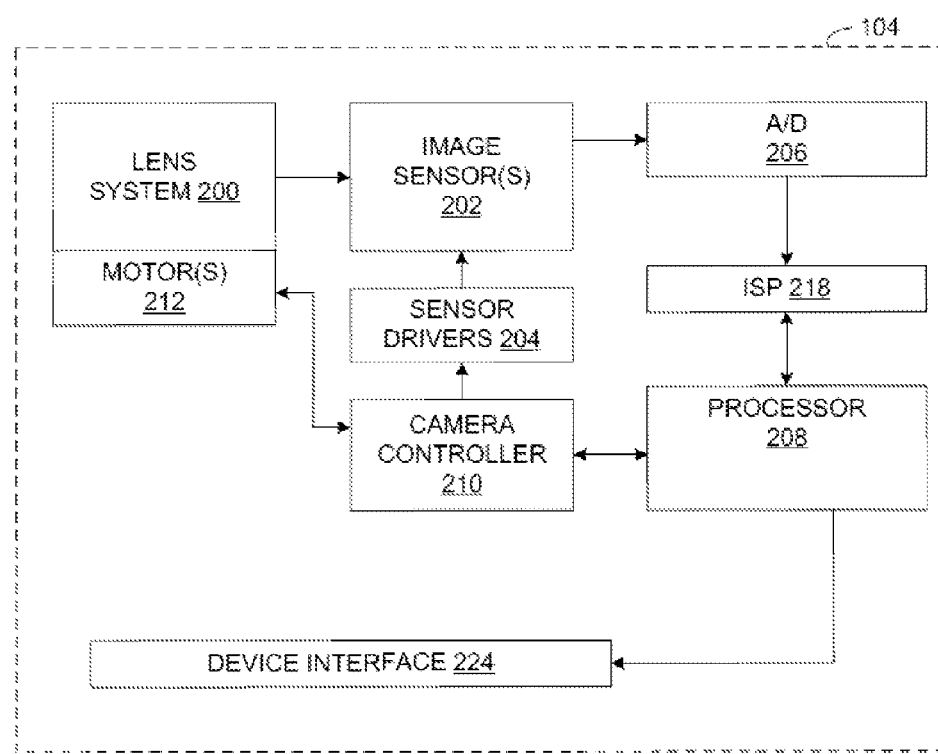
FIG. 2 is a drawing of an image capture device that can be incorporated into a mobile device shown in FIG. 1 according to various embodiments of the disclosure.

FIG. 2 illustrates an embodiment of the various image capture components, or one example of an image capture device 104, that can be incorporated in the mobile device 102 illustrated in FIGS. 1A-1B. Although one implementation is shown in FIG. 2 and described herein, an image capture device according to an embodiment of the disclosure more generally comprises an image capture device that can provide images in digital form.

The image capture device 104 includes a lens system 200 that conveys images of viewed scenes to an image sensor 202. By way of example, the image sensor 202 comprises a CCD or a CMOS sensor that is driven by one or more sensor drivers 204. The analog image signals captured by the sensor 202 are passed to an analog-to-digital (A/D) converter 206 for conversion into binary values that can be processed by a processor 208 and/or image signal processor (ISP) 218.

Operation of the sensor driver(s) 204 is controlled through a camera controller 210 that is in bi-directional communication with the processor 208. In some embodiments, the controller 210 can control one or more motors 212 that are used to drive the lens system 200 (e.g., to adjust focus, zoom, shutter, and/or aperture settings). The controller 210 can also communicate with a flash system, user input devices (e.g., buttons, dials, toggles, etc.) or other components associated with the image capture device 104. Operation of the camera controller 210 may be adjusted through manipulation of a user interface. A user interface comprises the various components used to enter selections and commands into the image capture device 104 and therefore can include various buttons as well as a menu system that, for example, is displayed to the user in, for example, a camera application executed on a mobile device 102 and/or on a back panel associated with a standalone digital camera.

The digital image signals are processed in accordance with instructions from an image signal processor 218 that can be implemented as a standalone processor within the image capture device 104, as well as being a part of the processor 208. Processed (e.g., compressed) images may then be stored in storage memory, such as that contained within a removable solid-state memory card (e.g., flash memory card). The embodiment shown in FIG. 2 further includes a device interface 224 through which the image capture device 104 can communicate with a mobile device 102 or other computing system in which it may be integrated. For example, the device interface 224 can allow the image capture device 104 to communicate with a main processor associated with a mobile device 102, as well as memory, mass storage, and/or other resources associated with the mobile device 102. The device interface 224 can communicate with a mobile device 102 in various communications protocols, and this communication can be facilitated, at a software level, by various device drivers, libraries, API's or other software associated with the image capture device 104 that is executed in the mobile device 102. It should be appreciated that the specific implementation and/or embodiments disclosed herein are merely examples.

Figure 3A:
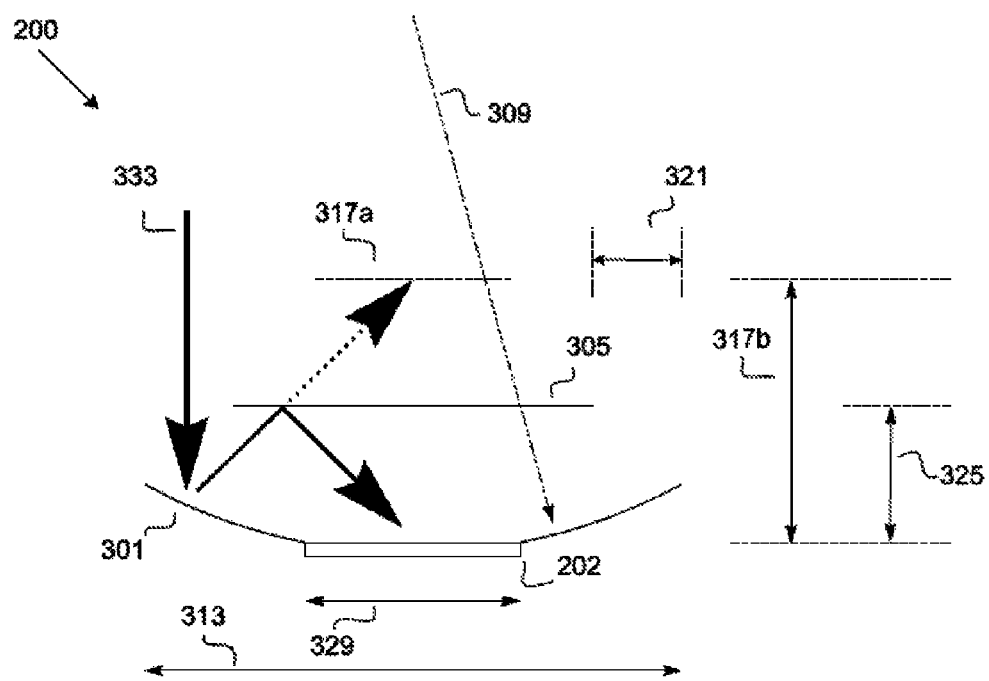
FIGS. 3A-5B, are drawings of various possible embodiment of the lens system according to various embodiments of the present disclosure.
Figure 3B:
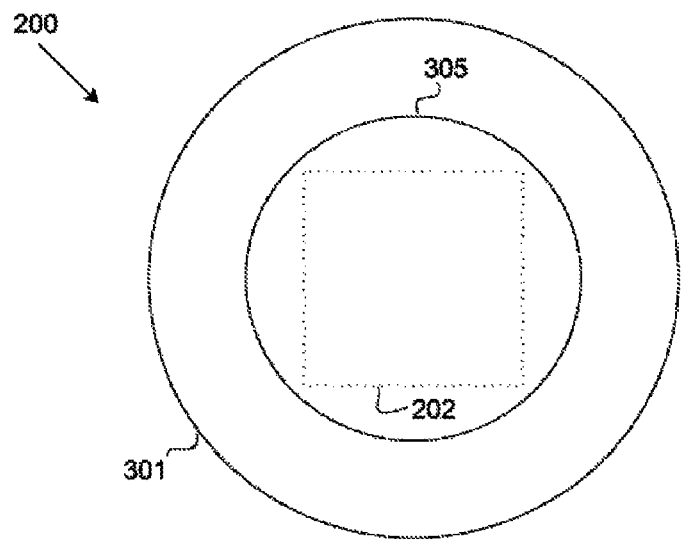

Referring next to FIGS. 3A and 3B, shown are various views of one possible embodiment of the lens system 200 into which an image sensor 202 is attached. The FIG. 3A provides a cutaway lateral-side view of the embodiment of the lens system 200. The FIG. 3B provides a top-side view of the embodiment of the lens system 200. The embodiment comprises a primary mirror 301, a secondary mirror 305, the image sensor 202, and potentially other auxiliary components not described herein. The primary mirror 301 may be a spherical or parabolic mirror with a reflective surface facing the secondary mirror 305, the reflective surface being suitable for reflecting visible light (e.g. aluminum glass mirror, silver glass mirror, aluminum coated with silicon dioxide, etc.). The dimensions of primary mirror 301 comprise a radius of curvature 309, a diameter 313, and a focal length 317a, b. For a primary mirror 301 of a spherical shape, the focal length 317a, b is one-half the radius of curvature 309. The diameter 313 of the primary mirror 301 may typically be in the range of approximately 50%-100% of the radius of curvature 309.

The secondary mirror 305 may be a circular flat mirror with a reflective surface facing the primary mirror 301, the reflective surface being suitable for reflecting visible light (e.g. aluminum glass mirror, silver glass mirror, aluminum coated with silicon dioxide, etc.). The secondary mirror 305 is suspended a height 325 from the floor of the primary mirror 301. The secondary mirror 305 further has a diameter that is less than the diameter 313 of the primary mirror 301, thus creating an aperture 321 between the secondary mirror 305 and the wall of the primary mirror 301.

The image sensor 202 may be centrally affixed to the floor of the primary mirror 301 with the sensing portion of the image sensor 202 facing the secondary mirror 305. To this end, the image sensor 202 may be affixed to the surface of the primary mirror 301, the primary mirror 301 may have a notch in which to embed the image sensor 202, and/or the image sensor 202 may be affixed to the primary mirror 301 using other techniques as can be appreciated. The image sensor 202 may be square, rectangular, or other possible shapes. The example embodiment shown in FIGS. 3A and 3B includes a square image sensor having a length 329.

Next, a general description of the operation of the various components of the lens system 200 is provided. The following operations may be initiated by a user attempting to capture an image using the image capture device 104 (FIG. 1B). To begin, a shutter of the lens system 200 opens allowing light 333 to enter the interior of the lens system 200. The light 333 passes through the aperture 321 and strikes the reflective surface of the primary mirror 301. The light 333 is reflected, or "folded," at an angle from the surface of the primary mirror 301 and strikes the reflective surface of the secondary mirror 305. The light 333 is reflected again from the secondary mirror 305 toward the image sensor 202.

The lens system 200 may be constructed such that the distance of the path of light 333, from the point it is first reflected from the primary mirror 301 until it strikes the image sensor 202, is equal to the focal length 317 of the primary mirror 301. Satisfying this equation may determine the height 325 of the flat mirror, the aperture 321, the length 329 of the image sensor 202, the number of folds of the light 333, as well as other possible dimensions of components of the lens system 200.

As a non-limiting example, the primary mirror 301 may have radius of curvature 309 of 20 millimeters (mm) and a diameter of 20 mm. Using the aforementioned formula for a spherically-shaped primary mirror, the primary mirror 301 would have a focal length 317 of 10 mm. In order to produce a twice-folded path of light 333 that also has a length of 10 mm suggests that the height 325 of the secondary mirror 305 should be approximately 5 mm above the floor of the primary mirror 301.

Given these dimensions of the example lens system 200 having an optical track of 5 mm, one can observe that employing an image sensor 202 with a typical thickness of 1 mm or less will result in a package that may be no more than 6 mm thick. Using a traditional optical path that does not employ optical folding, an optical track (and, hence, the optical path) of 5 mm will accommodate an image sensor 202 of approximately 5 mm square. Using present image sensor pixel densities, an image sensor 202 of 5 mm would be capable of capturing an 8 megapixel image.

However, using optical path folding of the present disclosure, a 5 mm optical track would create a 10 mm optical path allowing an image sensor 202 of up to 10 mm square. As a result of the increased allowable size of the image sensor 202 (a 2× increase in this example), the image sensor 202 may offer increased image capture resolution (up to 4×/32 megapixels), increased sensitivity, improved electro-optical characteristics, and/or other possible improvements.

Figure 4A:
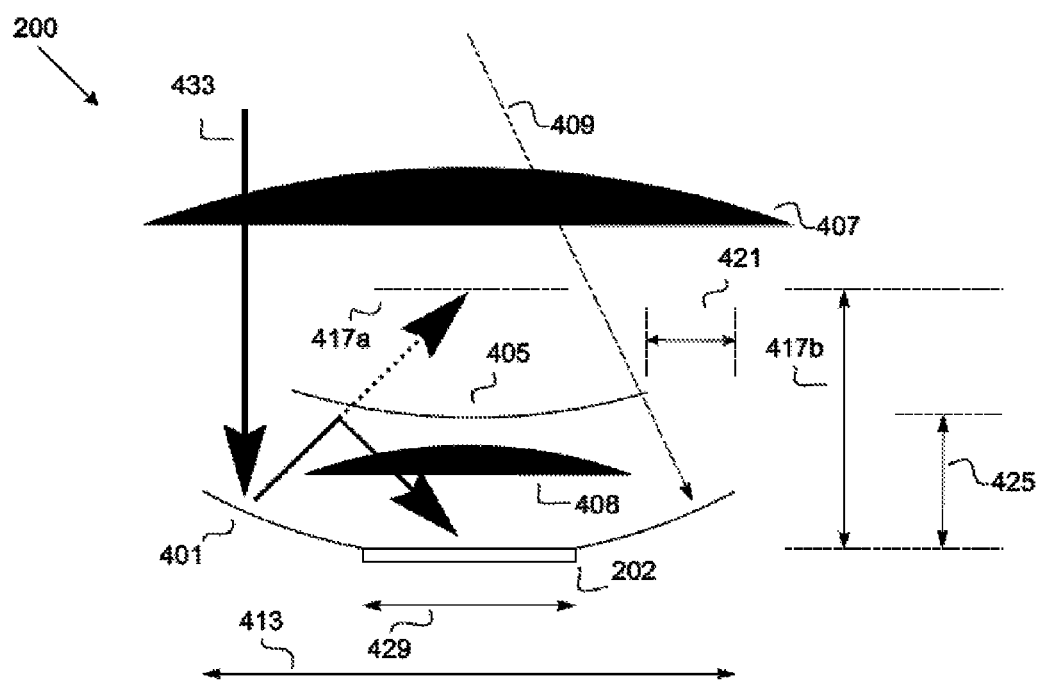
Figure 4B:
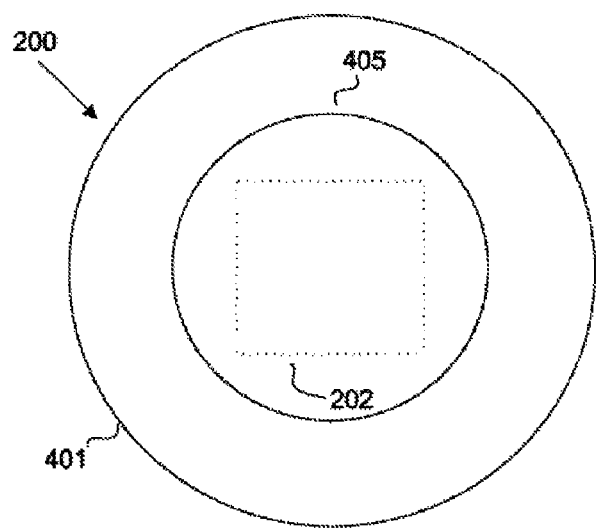

Referring next to FIGS. 4A and 4B, shown are various views of another possible embodiment of the lens system 200 into which an image sensor 202 is attached. The FIG. 4A provides a cutaway lateral-side view of this embodiment of the lens system 200. The FIG. 4B provides a top-side view of this embodiment of the lens system 200. The embodiment comprises a primary mirror 401, a secondary mirror 405, the image sensor 202, and potentially other auxiliary components not described herein. Variations of this embodiment may further comprise a primary refractive lens 407 and/or a secondary refractive lens 408 as shown in FIG. 4A. The primary refractive lens 407 and/or the secondary refractive lens 408 may be used to further improve optical quality by removing aberrations, adding functionality such as an optical zoom, and/or to reduce the optical track of the lens system 200.

The primary mirror 401 may be a spherical or parabolic mirror with a reflective surface facing the secondary mirror 405, the reflective surface being suitable for reflecting visible light (e.g. aluminum glass mirror, silver glass mirror, aluminum coated with silicon dioxide, etc.). The dimensions of primary mirror 401 comprise a radius of curvature 409, a diameter 413, and a focal length 417a, b. For a primary mirror 401 of a spherical shape, the focal length 417a, b is one-half the radius of curvature 409. The diameter 413 of the primary mirror 401 may typically be in the range of approximately 50%-100% of the radius of curvature 409.

The secondary mirror 405 may be a circular convex mirror with a reflective surface facing the primary mirror 401, the reflective surface being suitable for reflecting visible light (e.g. aluminum glass mirror, silver glass mirror, aluminum coated with silicon dioxide, etc.). The secondary mirror 405 is suspended a height 425 from the floor of the primary mirror 401. The secondary mirror 405 further has a diameter that is less than the diameter 413 of the primary mirror 401, thus creating an aperture 421 between the secondary mirror 405 and the wall of the primary mirror 401.

The image sensor 202 may be centrally affixed to the floor of the primary mirror 401 with the sensing portion of the image sensor 202 facing the secondary mirror 405. To this end, the image sensor 202 may be affixed to the surface of the primary mirror 401, the primary mirror 401 may have a notch in which to embed the image sensor 202, and/or the image sensor 202 may be affixed to the primary mirror 401 using other techniques as can be appreciated. The image sensor 202 may be square, rectangular, or other possible shapes. The example embodiment shown in FIGS. 4A and 4B includes a square image sensor having a length 429.

Next, a general description of the operation of the various components of the lens system 200 is provided. The following operations may be initiated by a user attempting to capture an image using the image capture device 104 (FIG. 1B). To begin, a shutter of the lens system 200 opens allowing light 433 to enter the interior of the lens system 200. The light 433 passes through the aperture 421 and strikes the reflective surface of the primary mirror 401. The light 433 is reflected, or "folded," at an angle from the surface of the primary mirror 401 and strikes the reflective surface of the secondary mirror 405. The light 433 is reflected again from the secondary mirror 405 toward the image sensor 202.

The lens system 200 may be constructed such that the distance of the path of light 433, from the point it is first reflected from the primary mirror 401 until it strikes the image sensor 202, is equal to at least one of the focal length 417a or 417b of the primary mirror 401. Satisfying this equation may determine the height 425 of the secondary mirror 405, the curvature radius of the secondary mirror 405, the aperture 421, the length 429 of the image sensor 202, the number of folds of the light 433, as well as other possible dimensions of components of the lens system 200.

As a non-limiting example, the primary mirror 401 may have radius of curvature 409 of 20 mm and a diameter of 20 mm. Using the aforementioned formula for a spherically-shaped mirror, the primary mirror 401 would have a focal length 417a, b of 10 mm. Using a secondary mirror 405 with a diameter of 13 mm and a curvature radius of 13 mm suggests that the height 425 of the secondary mirror 405 should be approximately 7.5 mm.

Figure 5A:
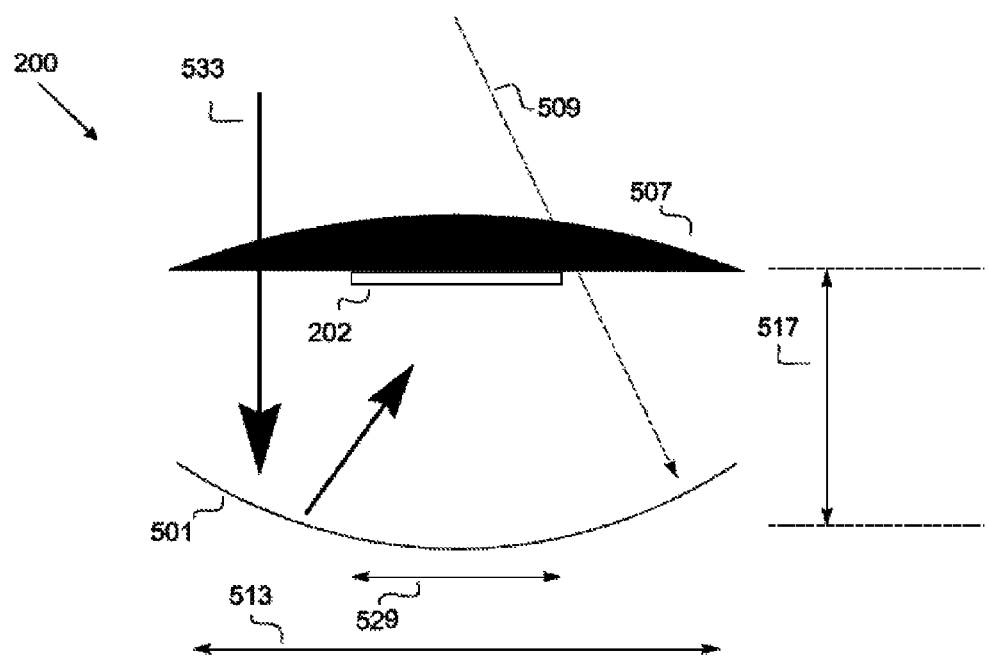
Figure 5B:
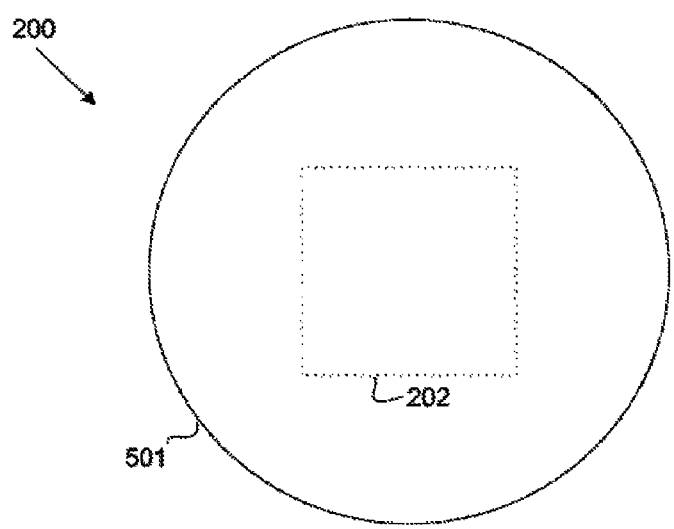

Referring next to FIGS. 5A and 5B, shown are various views of another possible embodiment of the lens system 200 into which an image sensor 202 is attached. The FIG. 5A provides a cutaway lateral-side view of the embodiment of the lens system 200. The FIG. 5B provides a top-side view of the embodiment of the lens system 200. The embodiment comprises a primary mirror 501, the image sensor 202, and potentially other auxiliary components not described herein. Variations of this embodiment may further comprise a primary refractive lens 507 as shown in FIG. 5A. The primary refractive lens 507 may be used to further improve optical quality by removing aberrations, adding functionality such as an optical zoom, and/or to reduce the optical track of the lens system 200.

The primary mirror 501 may be a spherical or parabolic mirror with a reflective surface facing the image sensor 202, the reflective surface being suitable for reflecting visible light (e.g. aluminum glass mirror, silver glass mirror, aluminum coated with silicon dioxide, etc.). The dimensions of primary mirror 501 comprise a radius of curvature 509, a diameter 513, and a focal length 517. For a primary mirror 501 of a spherical shape, the focal length 517 is one-half the radius of curvature 509. The diameter 513 of the primary mirror 501 may typically be in the range of approximately 50%-100% of the radius of curvature 509.

The image sensor 202 may be centrally affixed to the primary refractive lens 507 or other mounting structure allowing the sensing portion of the image sensor 202 to face the primary mirror 501. To this end, the image sensor 202 may be affixed to the mounting structure, the mounting structure may have a notch in which to embed the image sensor 202, and/or the image sensor 202 may be affixed to the mounting structure using other techniques as can be appreciated. The image sensor 202 may be square, rectangular, or other possible shapes. The example embodiment shown in FIGS. 5A and 5B includes a square image sensor having a length 529.

Next, a general description of the operation of the various components of the lens system 200 is provided. The following operations may be initiated by a user attempting to capture an image using the image capture device 104 (FIG. 1B). To begin, a shutter of the lens system 200 opens allowing light 533 to enter the interior of the lens system 200 and strike the reflective surface of the primary mirror 501. The light 533 is reflected, or "folded," at an angle from the surface of the primary mirror 501 and strikes the image sensor 202.

The lens system 200 may be constructed such that the distance of the path of light 533, from the point it is first reflected from the primary mirror 501 until it strikes the image sensor 202, is equal to the focal length 517 of the primary mirror 501. Satisfying this equation may determine the length 529 of the image sensor 202, the number of folds of the light 533, as well as other possible dimensions of components of the lens system 200.

As a non-limiting example, the primary mirror 501 may have radius of curvature 509 of 12 mm and a diameter of 12 mm. Using the aforementioned formula for a spherically-shaped mirror, the primary mirror 501 would have a focal length 517 of 6 mm. Using a single fold of the light 533, the image sensor 202 should be located approximately 6 mm above the floor of the primary mirror 501.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. An optical pathway, comprising:
a primary mirror;
an image sensor centered on a first reflective surface of the primary mirror;
a secondary mirror positioned with a second reflective surface facing the image sensor, the second reflective surface being convex, and the secondary mirror being centered with the primary mirror and located a first distance from the image sensor, the primary mirror extending beyond an edge of the secondary mirror;
a first refractive lens centered with the primary mirror and located a second distance from the image sensor, the second distance being greater than the first distance, the first refractive lens having a diameter greater than that of the secondary mirror; and
a second refractive lens centered with the image sensor, the second refractive lens being located between the primary mirror and the secondary mirror.

2. The optical pathway of claim 1, wherein the image sensor is a digital complementary metal-oxide-semiconductor (CMOS) pixel sensor.

3. The optical pathway of claim 1, wherein a diameter of the secondary mirror is at least as great as a length of the image sensor.

4. The optical pathway of claim 3, wherein a third distance from the image sensor to a focal length of the primary mirror is no more than 10 millimeters, and wherein the third distance is greater than the first distance and smaller than the second distance.

5. An optical pathway, comprising:
a primary mirror having a first reflective surface;
an image sensor centered with the primary mirror;
a first refractive lens centered with the primary mirror and located a first distance from the image sensor, the first refractive lens having a diameter which is at least as great as that of the primary mirror;
a secondary mirror having a second reflective surface, the secondary mirror located between the primary mirror and the first refractive lens; and
a second refractive lens centered with the image sensor, the second refractive lens being located between the primary mirror and the secondary mirror.

6. The optical pathway of claim 5, wherein the second reflective surface is convex.

7. The optical pathway of claim 5, wherein the primary mirror extends beyond an edge of the secondary mirror.

8. The optical pathway of claim 5, wherein the secondary mirror is centered with the primary mirror.

9. The optical pathway of claim 5, wherein a diameter of the secondary mirror is at least as great as a length of the image sensor.

10. The optical pathway of claim 5, wherein the image sensor is a digital complementary metal-oxide-semiconductor (CMOS) pixel sensor.

11. The optical pathway of claim 5, wherein the primary mirror comprises a notch in which the image sensor is placed.

12. The optical pathway of claim 5, wherein a diameter of the primary mirror exceeds a length of the image sensor.

13. The optical pathway of claim 5, wherein the first refractive lens, the primary mirror, and the image sensor are centered about an axis.

14. The optical pathway of claim 5, wherein the primary mirror has a radius of curvature which is twice a length of the image sensor.

15. The optical pathway of claim 5, wherein the image sensor has a sensor surface which is flush with the first reflective surface of the primary mirror.

16. A method, comprising:
receiving a light ray through a first refractive lens;
reflecting the light ray using a primary mirror, the primary mirror having a first reflective surface, the first refractive lens having a diameter which is at least as great as that of the primary mirror;
reflecting the light ray using a secondary mirror, the secondary mirror having a second reflective surface, the light ray being reflected from the first reflective surface to the second reflective surface, the secondary mirror located between the primary mirror and the first refractive lens;
receiving the light ray through a second refractive lens, the second refractive lens being located between the primary mirror and the secondary mirror; and
detecting the light ray in an image sensor, the light ray being reflected from the second reflective surface through the second refractive lens to the image sensor.

17. The method of claim 16, further comprising:
receiving the light ray through a second refractive lens, the light ray being reflected from the second reflective surface to the image sensor via the second refractive lens.

18. The method of claim 16, further comprising:
generating an image based on the light ray detected by the image sensor.

19. The method of claim 16, wherein a distance from the image sensor to a focal length of the primary mirror is no more than 10 millimeters.

20. The method of claim 16, wherein a diameter of the secondary mirror is at least as great as a length of the image sensor.

* * * * *